(12) United States Patent
Filevich

(10) Patent No.: US 10,746,672 B2
(45) Date of Patent: Aug. 18, 2020

(54) LAMELLA-SHAPED TARGETS FOR X-RAY GENERATION

(71) Applicant: FEI Company, Hillsboro, OR (US)

(72) Inventor: Jorge Filevich, Portland, OR (US)

(73) Assignee: FEI Company, Hillsboro, OR (US)

( * ) Notice: Subject to any disclaimer, the term of this patent is extended or adjusted under 35 U.S.C. 154(b) by 23 days.

(21) Appl. No.: 16/032,889

(22) Filed: Jul. 11, 2018

(65) Prior Publication Data

US 2019/0017942 A1 Jan. 17, 2019

Related U.S. Application Data

(60) Provisional application No. 62/531,097, filed on Jul. 11, 2017.

(51) Int. Cl.
*G01N 23/046* (2018.01)
*G21K 7/00* (2006.01)
*H01J 35/08* (2006.01)

(52) U.S. Cl.
CPC .......... *G01N 23/046* (2013.01); *G21K 7/00* (2013.01); *H01J 35/08* (2013.01);
(Continued)

(58) Field of Classification Search
CPC ....... G01N 2223/401; G01N 2223/419; G01N 23/046; G21K 7/00; H01J 2235/081; H01J 2235/086; H01J 35/08
See application file for complete search history.

(56) References Cited

U.S. PATENT DOCUMENTS 5,148,462 A * 9/1992 Spitsyn ............... H01J 35/08
378/121
8,068,579 B1 * 11/2011 Yun ................. G01N 23/046
378/21

(Continued)

FOREIGN PATENT DOCUMENTS

JP 5515250 Y2 * 4/1980
JP S5515250 Y2 4/1980
WO 2010134282 A1 11/2010

OTHER PUBLICATIONS

Ueda, Kazuyuki, "Development of new X-ray microscopy using a low-energy electron beam", Applied Surface Science 237 (2004) pp. 636-640. (Year: 2004).*

*Primary Examiner* — Chih-Cheng Kao

(57) ABSTRACT

A method and system are disclosed for producing an x-ray image of a sample using a lamella-shaped target to improve the usual tradeoff between imaging resolution and image acquisition time. A beam of electrons impacts the lamella-shaped target normal to the narrower dimension of the lamella which then determines the virtual source size along that axis. For low-energy x-ray generation, the small electron penetration depth parallel to the wider dimension of the lamella determines the virtual source size along that axis. Conductive cooling of the target is improved over post targets with the same imaging resolution. The lamella-shaped target is long enough to ensure that the electron beam does not impact the support structure which would degrade the imaging resolution. Target materials may be selected from the same metals used for bulk or post targets, including tungsten, molybdenum, titanium, scandium, vanadium, silver, or a refractory metal.

24 Claims, 20 Drawing Sheets

(52) U.S. Cl.
CPC .. *G01N 2223/401* (2013.01); *G01N 2223/419* (2013.01); *H01J 2235/081* (2013.01); *H01J 2235/086* (2013.01)

(56) References Cited

U.S. PATENT DOCUMENTS

| | | | | |
|---|---|---|---|---|
| 2003/0108155 | A1* | 6/2003 | Wilkins | G21K 7/00 378/119 |
| 2008/0019481 | A1 | 1/2008 | May | |
| 2008/0025458 | A1* | 1/2008 | Virshup | A61B 6/032 378/6 |
| 2008/0089484 | A1* | 4/2008 | Reinhold | H01J 35/08 378/138 |
| 2009/0238340 | A1* | 9/2009 | Okada | H01J 35/08 378/140 |
| 2015/0092924 | A1* | 4/2015 | Yun | H01J 35/12 378/143 |
| 2015/0303021 | A1* | 10/2015 | Parker | G01N 23/046 378/10 |
| 2016/0351370 | A1* | 12/2016 | Yun | H01J 35/08 |

\* cited by examiner

SECTION A-A

900

| E-Beam Energy | Source Parameter | FIGS. 1A-1D and 3<br>Bulk Target | FIGS. 3A-3D and 2<br>Post Target | FIGS. 4A-4D and 2<br>Lamella-Shaped Target with a Round Beam | FIGS. 5A-5B and 2<br>Lamella-Shaped Target with an Astigmatic Beam |
|---|---|---|---|---|---|
| >5 keV | Y-axis source size | may be large: Y-dimension of electron dispersion | may be small: Y-dimension of post | may be small: Y-dimension of target | may be small: Y-dimension of target |
| | Z-axis source size | may be large: Z-dimension of electron dispersion | may be small: Z-dimension of post | may be large: Z-dimension of electron dispersion | may be large: Z-dimension of electron dispersion |
| | X-ray generation efficiency | high: full energy absorption in target | lower than bulk | between bulk and post | higher than for a round e-beam with a lamella target |
| | X-axis heat dissipation | -X-direction | -X-direction | -X-direction | -X-direction |
| | Y-axis heat dissipation | ±Y-direction | none | none | none |
| | Z-axis heat dissipation | -Z-direction | none | -Z-direction | -Z-direction |
| | total heat dissipation | high | low | between bulk and post | between bulk and post |
| <2 keV | Y-axis source size | may be large: Y-dimension of electron dispersion or diameter of e-beam | may be small: Y-dimension of post | may be small: Y-dimension of target | may be small: Y-dimension of target |
| | Z-axis source size | small: Z-depth of electron dispersion (e.g., 50 nm for 1.5 keV) | small, smaller of: Z-dimension of post or Z-depth of electron dispersion (e.g., 50 nm for 1.5 keV) | small: Z-depth of electron dispersion (e.g., 50 nm for 1.5 keV) | small: Z-depth of electron dispersion (e.g., 50 nm for 1.5 keV) |
| | X-ray generation efficiency | high: full energy absorption in target | lower than bulk if e-beam diameter exceeds Y-dimension of post | lower than bulk if e-beam diameter exceeds Y-dimension of target, similar to post | higher than for a round e-beam with a lamella target |
| | X-axis heat dissipation | -X-direction | -X-direction | -X-direction | -X-direction |
| | Y-axis heat dissipation | ±Y-direction | none | none | none |
| | Z-axis heat dissipation | -Z-direction | none | -Z-direction | -Z-direction |
| | total heat dissipation | high | low | between bulk and post | between bulk and post |

FIG. 9

LAMELLA-SHAPED TARGETS FOR X-RAY GENERATION

TECHNICAL FIELD OF THE INVENTION

The present invention relates to systems for generating x-rays and, in particular, to x-ray targets designed to increase the resolution and/or throughput of x-ray imaging and tomography systems.

BACKGROUND OF THE INVENTION

An x-ray tomography system can provide information of the internal structure of a sample without having to destroy or cross-section the sample. The X-rays are passed through the sample and detected by an x-ray detector to obtain an absorption image from a cross-section of the sample. The x-ray detector acquires a two-dimensional x-ray shadow (absorption-contrast) image. For three-dimensional tomography, the sample and/or x-ray source and detector may be incrementally rotated to enable cross sectional images to be obtained from multiple angles. The set of cross-sectional images obtained in this manner can then be mathematically manipulated to reconstruct a 3D image of the sample.

The term: "SEM-based nanotomography system" comprises any system using an electron beam impinging on a target to generate x-rays and includes a range of x-ray systems designed for very high resolution 2D x-ray imaging and 3D x-ray tomography. Such systems differ from the more common x-ray systems used for lower-resolutions (e.g., >1 µm) in their use of an electron beam produced by a scanning electron microscope (SEM), transmission electron microscope (TEM), or scanning transmission electron microscope (STEM), to generate x-rays from a virtual x-ray source typically smaller than ~500 nm. As the electrons in the beam impact the target, x-rays are generated.

Two important parameters of an x-ray tomography system are resolution and throughput. Throughput refers to how fast the system can acquire an image or set of images. While there are many definitions of "resolution," it typically refers to how close two objects can be and still be distinguished as two distinct objects. Resolution affects how small a feature the system can image. Throughput can be increased by increasing the flux of x-rays passed through the sample, which may be achieved by increasing the electron beam current impacting the target. However, the impact of the electron beam with the target can cause excessive heating and even melting of the target, thus electron beam currents may be limited to less than 1-2 µA for beam energies up to 60 keV. Because the electron beam diameters are in the sub-micron range, extremely high energy densities typically arise within the targets.

While some x-ray generating systems use focusing optics to focus the generated x-rays, other systems do not use focusing optics. The resolution of an x-ray tomography system without x-ray focusing optics is determined in large part by the effective ("virtual") size of its x-ray source. For systems using an electron beam to generate x-rays, the effective source size is often determined by the volume within which the beam electrons interact with and come to rest in the target. This interaction volume is largely determined by the density and atomic number of the target material, and the diameter and energy of the electron beam, and is typically tear-drop shaped. The design of the x-ray target is a critical determinant of the system performance with respect to resolution, imaging time, and image signal-to-noise ratios, as well as other operational considerations.

The original targets employed in these systems were "bulk targets"—typically pieces of target material (usually metals such as tungsten, molybdenum, titanium, scandium, vanadium, silver, or other a refractory metal, etc.) which were much larger than the diameter of the electron beam used to induce x-ray emission. Since the great majority of the energy of the electron beam striking the target goes into producing heat (not x-rays), the high cooling efficiency of these types of targets was advantageous in maximizing x-ray fluxes and thus throughputs. However, imaging resolutions were limited by the spreading of the electron beam within the target material, since the electron dissipation volume also corresponds to the virtual source size, and thus resolutions were limited.

More recently, a new type of x-ray target has been employed in SEM-based nanotomography systems, as disclosed in U.S. Pat. Publ. No. 2015/0303021, "High Aspect Ratio X-Ray Targets and Uses of Same", which is assigned to the assignee of this invention. Post targets comprise very small, approximately rectangular (cross-section), targets having dimensions typically <500 nm in the two axes which determine the virtual source size (e.g., Y-Z in FIG. 3D) and are about 1-2 µm long (X-dimension), attached to a support base. The diameter of the beam spot at the target may be larger than the largest dimension (e.g., diameter of a cylindrical post or diagonal of a rectangular prism post) of a cross section of the post. The support base may be composed of a material such as silicon, aluminum, beryllium, or other low atomic number material, which generates fewer x-rays upon impact of the electron beam than the target material. An electron beam striking the end of a post target will generate x-rays with a virtual source size controlled by the Y-Z dimensions of the post, rather than the electron dispersion distance as in a bulk target—thus higher imaging resolutions are possible with post targets than with bulk targets. However, due to the small cross-sectional area of the posts, thermal conductivity is much lower than for a bulk target, and thus excessive heating presents a limit to the allowable electron beam energy which may be deposited into the target before melting may occur (even for tungsten targets).

Hence, both the commonly-used bulk targets, and the more recently-developed post targets present difficulties for optimizing the resolution and throughput of a SEM-based nanotomography system. Embodiments described in FIGS. 4A-5B address some of these concerns, with FIG. 9 providing a comprehensive summary of the source parameters of the various source types.

FIGS. 1A-1D show four views of the operation of an x-ray source employing a bulk target 108 impacted by a round electron beam 106. Bulk targets typically comprise a target material, such as tungsten, molybdenum, titanium, scandium, vanadium, silver, or other a refractory metal, etc., which is relatively large in X-Y-Z dimensions compared to the anticipated size of the electron beam which will be directed towards the target to generate x-rays.

FIG. 1A is an isometric view of a bulk target 108 with an upper surface 104 being bombarded by electrons 102 in an electron beam which has been focused into a round electron beam 106 by an electron column (not shown) such as would be found in a scanning electron microscope (SEM), transmission electron microscope (TEM), scanning transmission electron microscope (STEM), or any electron beam system capable of focusing a high current density electron beam onto a target. As a result of the impact of electrons 102 with bulk target 108, x-rays are generated which propagate out in all directions (into a 4π steradians solid angle). X-ray flux 112 represents only the very small fraction (typically 0.1 to 0.4%) of the total x-ray flux which is emitted through the front surface 110 of target 108 in a direction towards an x-ray detector (see FIG. 2). The great majority of the total x-ray flux (not including x-rays 112) generated by impact of electron beam 106 with the bulk target 108 will be emitted in directions away from the x-ray detector and thus will not contribute to x-ray imaging.

FIG. 1B is a top view (in the X-Y plane) of the x-ray source from FIG. 1A, illustrating two cross-sections A-A and B-B, which are presented in FIGS. 1C and 1D, respectively. Also illustrated is the dissipation of heat 122 generated in target 108 by absorption of kinetic energy from electrons 102. Typically, almost all the electron energy produces heat, with only a small fraction of the electron energy producing x-rays. Because the electron beam 106 is relatively small compared to the dimensions of the bulk target, heat 122 may dissipate out rapidly by thermal conduction over an ~180° range (i.e., not through surface 110) in the X-Y plane within target 108 as shown.

FIG. 1C is a side cross-sectional view A-A (in the X-Z plane) of the x-ray source from FIGS. 1A-1B. The penetration distance of electrons 102 into the target 108 is typically a bulb-shaped volume 142 with a depth down from top surface 104 determined by the energy of electrons 102. For high energy electrons 102 the penetration depth may be microns, while for 1.5 keV electrons the penetration depth may be only ~50 nm. A fraction of the x-rays generated within target 108 may be reabsorbed within target 108 before reaching exit surface 110. In the case of ~0.5 keV x-rays generated in a titanium target fewer than 20% will typically be absorbed within target 108. As can be seen, heat 122 may dissipate out over an ~90° range (i.e., not through surfaces 104 or 110) in the X-Z plane from the electron penetration volume 142.

FIG. 1D is a front cross-sectional view B-B (in the Y-Z plane) of the x-ray source from FIGS. 1A-1B. The penetration volume 162 in general will look much like penetration volume 142 in FIG. 1C for cases where the electron beam 102 impacting target 108 is round. As can be seen, heat 122 may dissipate out over an ~180° angular range in the Y-Z plane from the electron penetration volume 162.

The wide angular ranges of heat dissipation 122 illustrated in FIGS. 1B-1D show that heat dissipation within a bulk target can be rapid going away from the electron beam (impact region) 106 of the electrons 102 with target 108. Thus, relatively high electron beam powers may be employed, enabling larger x-ray fluxes to be generated. A typical "rule of thumb" for x-ray generation is that x-rays produced by an electron beam will have energies ranging up to about ⅓ of the energy of the electron beam, thus a 30 keV electron beam will efficiently generate x-rays mostly below ~10 keV, while a higher energy 60 keV electron beam will generate x-rays mostly with energies below ~20 keV. For some applications, however, much lower x-ray energies may be preferred and will be discussed below.

A bulk target is thus able to dissipate heat generated in the target from the impact of the electron beam. A disadvantage of a bulk target is that the virtual source size is determined by the penetration volume (142 in FIG. 1C and 162 in FIG. 1D). The achievable imaging resolution is fundamentally determined by the source size, thus the larger the source size, the lower the resolution in 2D x-ray images or in 3D x-ray tomographic reconstructions. These issues are discussed further in a subsequent section. Table 900 in FIG. 9 summarizes many of the source parameters just discussed.

Typically, the bulk target may be attached to a support structure, which, in turn, may be affixed to a support arm, as illustrated in FIG. 8.

FIG. 2 shows a top view (in the X-Y plane) projection x-ray imaging arrangement 200. X-rays are emitted from a target 202 due to the impact of an electron beam (not shown), as illustrated in FIGS. 1A-1D. X-rays generated in target 202 are emitted in all directions (4π steradians), however a small fraction (typically 0.1 to 0.4%) 204 of the total x-ray flux is emitted into the solid angle subtended by the x-ray detector 208 with respect to target 202. For x-ray imaging or x-ray tomography of a sample 206, a portion of x-rays 204 will pass through sample 206, with a fraction of the x-rays being absorbed by sample 206, thereby producing a shadow image at detector 208. The flow chart in FIG. 10 describes a method for x-ray imaging or x-ray tomography employing an experimental configuration as shown in FIG. 2.

FIGS. 3A-3D show four views of an x-ray source employing a post target 308 impacted by a round electron beam 306. Post targets typically comprise some of the same target materials as bulk targets, such as tungsten, molybdenum, titanium, scandium, vanadium, silver, or a refractory metal, etc. However, unlike the situation for bulk targets, post targets comprise a very small structure elongated along the desired x-ray emission direction (i.e., towards the sample and detector —see FIG. 2). The virtual source size for a post target is determined by the transverse dimensions (i.e., dimensions along the Y- and Z-axes perpendicular to the X-axis of x-ray emission towards the sample and detector— see FIG. 2). The transverse dimension in the Y direction may be smaller than the diameter of the electron beam, so that the size of the virtual x-ray source in the Y direction is determined by the Y dimension of the target and not by the diameter of the electron beam.

Post target 308 is supported on a support structure (not shown) which would be at the upper left of FIG. 3A. To avoid x-ray generation 312 from the support structure due to impact by electrons 302 in electron beam 306, at least two approaches are possible. In some embodiments, the support structure may be fabricated from a material that is less efficient (typically lower atomic number, such as silicon, aluminum or beryllium) at x-ray generation than the material of post target 308, thus even if the edge of electron beam 306 impacts the support structure, minimal extraneous x-ray generation will result which might affect the resolution in the x-ray image. In other embodiments, the support structure may be fabricated from the same material as post target 308, however, post target 308 would be fabricated with sufficient length (X-axis) to ensure that the electron beam 306 only impacts post target 308 and not the support structure. These two approaches may be combined in still other embodiments.

FIG. 3A is an isometric view of a post target 308 with an upper surface 304 being bombarded by electrons 302 in an electron beam which has been focused into a round electron beam 306 by an electron column such as would be found in a scanning electron microscope (SEM), transmission electron microscope (TEM), scanning transmission electron microscope (STEM), or any electron beam system capable of focusing a high current density electron beam onto a target. Unlike the case for electron beam 106 in FIGS. 1A-1D, here some electrons 302 may miss the narrow post target 308, travelling past target 308 on either side and thus not producing x-rays. In addition, because the Z-axis thickness of the post target may be smaller than the penetration depth (such as penetration depths 142 or 162 in FIGS. 1C and 1D, respectively), some of electrons 302 may travel out the lower surface of post target 308. Because some electrons 302 may not impact the post target 308 and some other electrons 302 may pass through the post target 308, x-ray generation by post targets may be less efficient (measured in x-ray flux for a given electron beam current) than for a bulk target. As was the case for the bulk target 108 in FIGS. 1A-1D, the impact of electrons 302 with post target 308 generates x-rays which propagate out in all directions (into a 4π steradians solid angle). X-ray flux 312 represents the very small fraction (typically 0.1 to 0.4%) of the total x-ray flux which is emitted through the front surface 310 of target 308 in a direction towards an x-ray detector (see FIG. 2).

FIG. 3B is a top view (in the X-Y plane) of the x-ray source from FIG. 3A, illustrating two cross-sections C-C and D-D, which are presented in FIGS. 3C and 3D, respectively. Also illustrated is the dissipation of heat 322 generated in target 308 by absorption of kinetic energy from electrons 302. Typically, almost all the electron energy produces heat, with only a small fraction of the electron energy producing x-rays, however for a given electron beam current, less heat will be deposited into the post target 308 than would typically be the case for a bulk target 108 due to the two factors discussed above: electrons missing the target, and electrons passing clear through the target. As is shown schematically in FIGS. 3B-3C, heat dissipated in the post target 308 is not transmitted efficiently away from the impact region of electron beam 306, as illustrated by dissipation arrows 322 where heat may only be conducted down the length of the post target 308 (in the x-direction only), not away in both the X- and Y-directions as was the case for the bulk target 108. Thus, although a post target may absorb somewhat less heat from the electron beam, the temperature rise of the end of post target 308 (at electron beam 306) may be much larger than for a bulk target 108 impacted by the same electron beam current at the same beam voltage.

FIG. 3C is a side view cross-section C-C (in the X-Z plane) of the post target x-ray source from FIGS. 3A-3B. As discussed above, since the Z-axis dimension of the post target 308 is smaller than a typical penetration distance of electrons 302, electrons 302 may pass entirely through post target 308, emerging out the bottom as shown. Thus, unlike the situation for a bulk target 108, for energetic electron beams (e.g., with energies above ~5 keV), x-rays may be emitted from the full Z-axis dimension of post target 308 (region 342), and the Z-axis source size would then correspond to the Z-axis dimension of post target 308. For lower energy electron beams (e.g., 1.5 keV), where the penetration depth may be only ~50 nm, the electron beam may stop within a post target 308 having a Z-axis dimension exceeding the penetration depth (i.e., a Z-axis dimension >50 nm for 1.5 keV electrons). A fraction of the x-rays generated within target 308 may be reabsorbed within target 308 before reaching exit surface 310.

FIG. 3D is a front view cross-section D-D (in the Y-Z plane) of the post target x-ray source from FIGS. 3A-3C. The virtual source size will essentially correspond to the surface 310.

The narrow angular ranges of heat dissipation 322 illustrated in FIGS. 3B-3D show that heat dissipation within a post target may be substantially reduced compared with the bulk target in FIGS. 1A-1D. Thus, relatively lower electron beam powers (decreased electron beam currents, although possibly at the same beam voltage) may be required relative to bulk targets to avoid target melting, thereby generating lower x-ray fluxes. Since for a post target the virtual source size is determined by the Y- and Z-axis dimensions of the post, which may be substantially smaller than the penetration depths 142 and 162 in a bulk target 108 (which determine the source size for the bulk target), higher 2D imaging and 3D tomographic resolutions may be achievable with a post target, although possibly with longer image acquisition times arising from the lower x-ray fluxes produced by post targets. Typically, the post target may be attached to a support structure, which, in turn, may be affixed to a support arm, as illustrated in FIG. 8. The X-Y-Z dimensions of post target 308 may be determined by the following criteria:

X-dimension (length perpendicular to the electron beam)—preferably large enough to prevent the electron beam from impacting the support structure, but also preferably not so long as to make thermal conduction poor from the end (where the electron beam 306 impacts).

Y-dimension (width perpendicular to the electron beam)—comparable to the desired Y-axis resolution in the x-ray image.

Z-dimension (depth parallel to the electron beam)—comparable to the desired Z-axis resolution in the x-ray image.

Thus, it would be advantageous to improve throughput while maintaining resolution in an x-ray imaging system.

It would also be advantageous to provide an improved x-ray target design with improved throughput in the generation of low-energy x-rays while maintaining a sub-micron virtual source size.

It would in addition be advantageous to provide an x-ray imaging system with improved imaging performance employing low energy x-rays to enable x-ray imaging in the energy range corresponding to the "water window", which is a region of the x-ray spectrum between 280 and 530 eV (x-ray energy) where natural contrast occurs between water and biological materials.

SUMMARY OF THE INVENTION

An object of the invention is to provide improved systems that use charged particle beams to produce x-rays for imaging.

A system for producing an x-ray image of a sample uses a lamella-shaped target to improve the usual tradeoff between imaging resolution and image acquisition time. An electron beam is directed along a first axis onto a first surface of a lamella-shaped target. The impact of the electrons in the beam onto the lamella-shaped target generates x-rays from within an interaction volume within the lamella-shaped target, and a portion of the x-rays are emitted towards an x-ray detector. A sample is positioned along a second axis between the lamella-shaped target and the x-ray detector. An x-ray image is acquired by collecting the x-rays which are not absorbed by the sample.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 9 is a table of source parameters for various target types.

DETAILED DESCRIPTION OF EMBODIMENTS

Figure 1A:
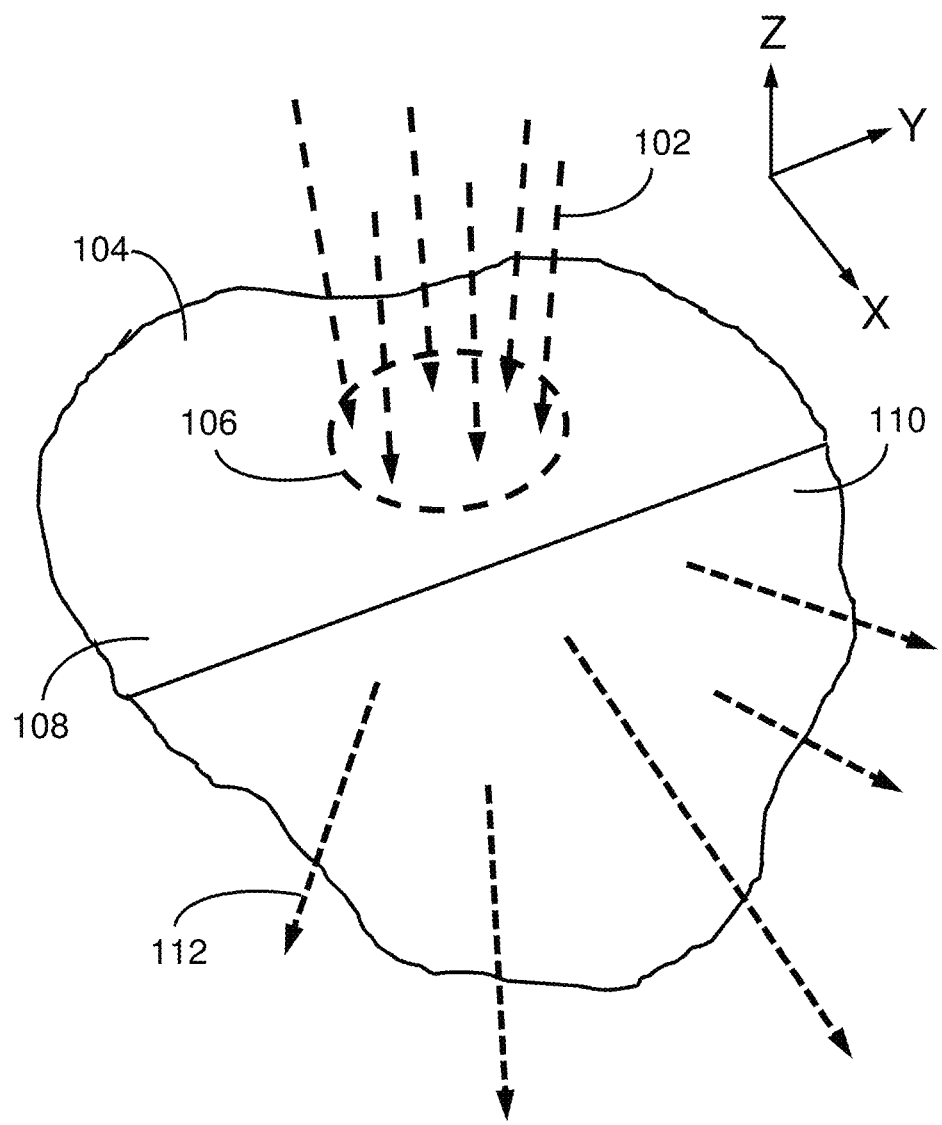
FIGS. 1A-1D show views of an x-ray source employing a bulk target.
Figure 1B:
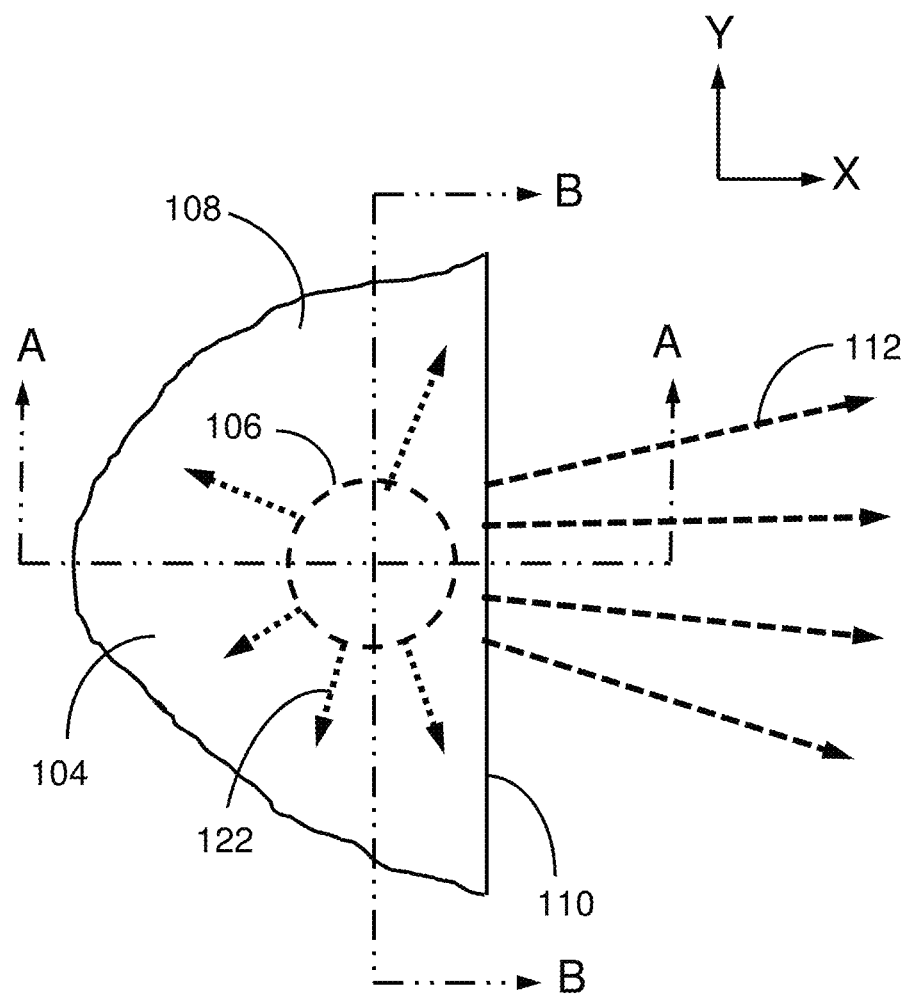
Figure 1C:
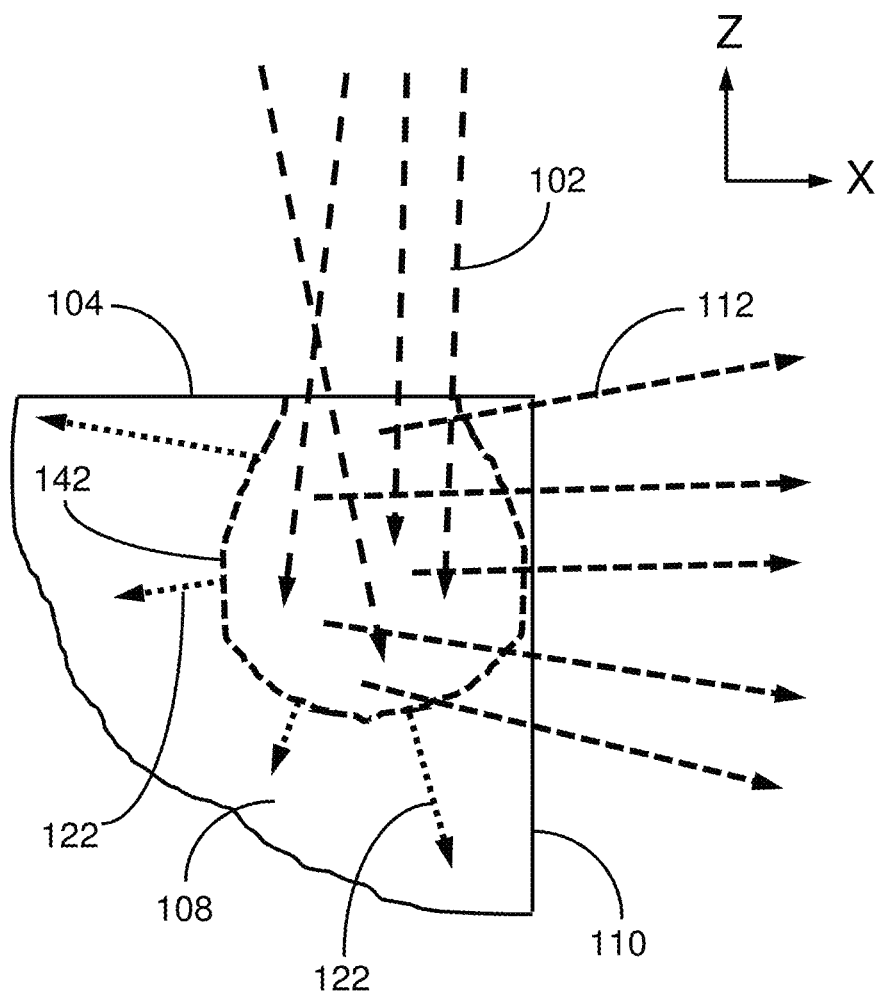
Figure 1D:
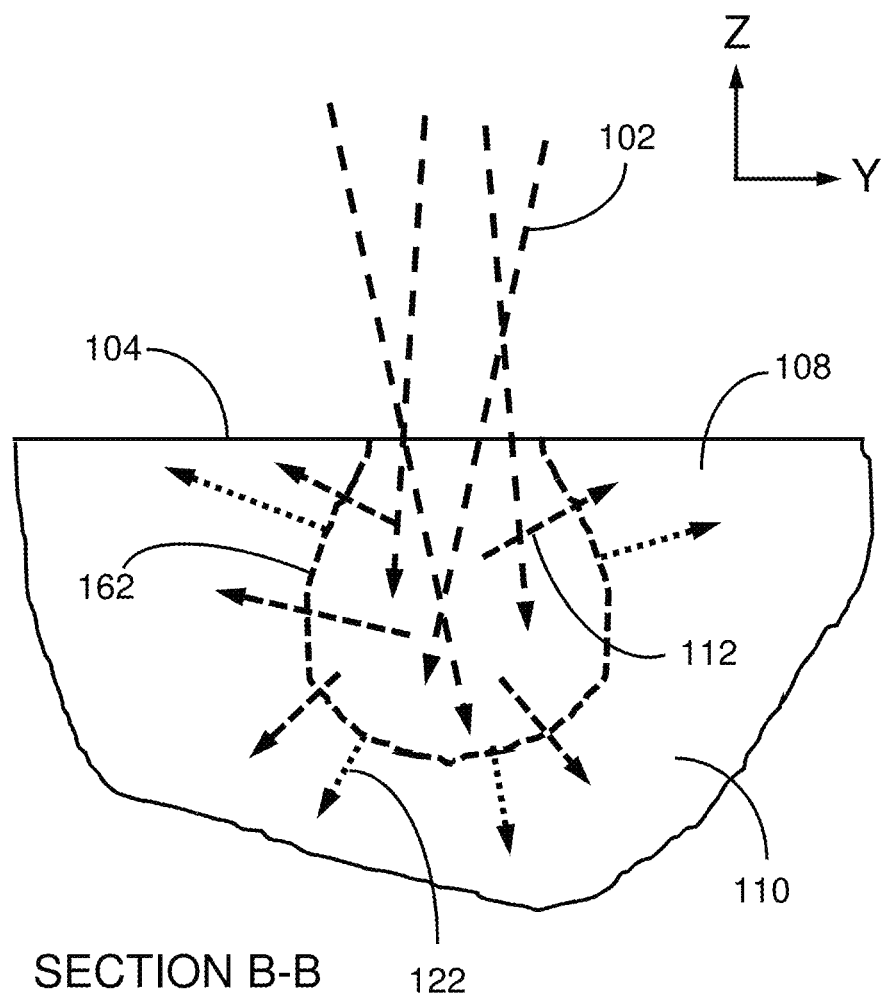

X-ray targets described below for use in SEM-based tomography systems can provide improved resolution and/or throughput of imaging systems incorporating them. Lamella-shaped targets provide some of the benefits of both bulk targets and post targets, while avoiding some of the disadvantages of these targets. A "lamella-shaped target" as used herein means a target that is shaped like a thin plate, having a height (along the electron beam axis) and a length (along an axis between the target and the detector) that are at least two times the target's width (along a line on the surface of the target facing the detector, the line normal to the electron beam axis).

Post targets are useful because they provide a small virtual source size, but the small height of the post reduces the thermal conductivity, limiting the electron beam current that can be used. Applicant has found that one can limit the virtual source size in the direction along the beam axis by limiting the size of the beam interaction volume, for example, by using relatively low energy photons (e.g., less than 1,000 eV, preferably less than 500 eV, and particularly in the range of between 280 and 530 eV where natural contrast occurs between water and biological materials) or by using a target material having low electron penetration. If the interaction volume does not extend to the bottom of the lamella-shaped target, then the additional height of the target below the interaction volume will not affect the virtual source size in that direction, but the additional height will provide more target material to carry heat away from the impact point of the beam. In some embodiments, the interaction volume extends below the surface facing the electron column by an amount less than the height of the lamella-shaped target. In some embodiments, the interaction volume extends less than half of the height of the lamella-shaped target. In some embodiments, the interaction volume extends less than one quarter of the height of the lamella-shaped target.

FIGS. 4A-4D show views of an x-ray source employing a lamella-shaped target 408 with a round electron beam 406.

An x-ray source with a lamella-shaped target may combine some of the advantages of both the bulk and post targets, while avoiding some of their disadvantages as summarized in table 900 in FIG. 9. Lamella-shaped targets 408 may typically comprise some of the same target materials as bulk targets 108 or post targets 308, including tungsten, molybdenum, titanium, scandium, vanadium, silver, or a refractory metal, etc. Lamella-shaped targets 408 present the same narrow Y-axis dimension to the electron beam 406 as a post target, but have a larger Z-axis dimension more characteristic of a bulk target, thereby enabling improved heat conduction and potentially higher x-ray fluxes to be achieved, while still achieving a small virtual source dimension in the Z-axis, especially for low-energy x-ray production.

Figure 4A:
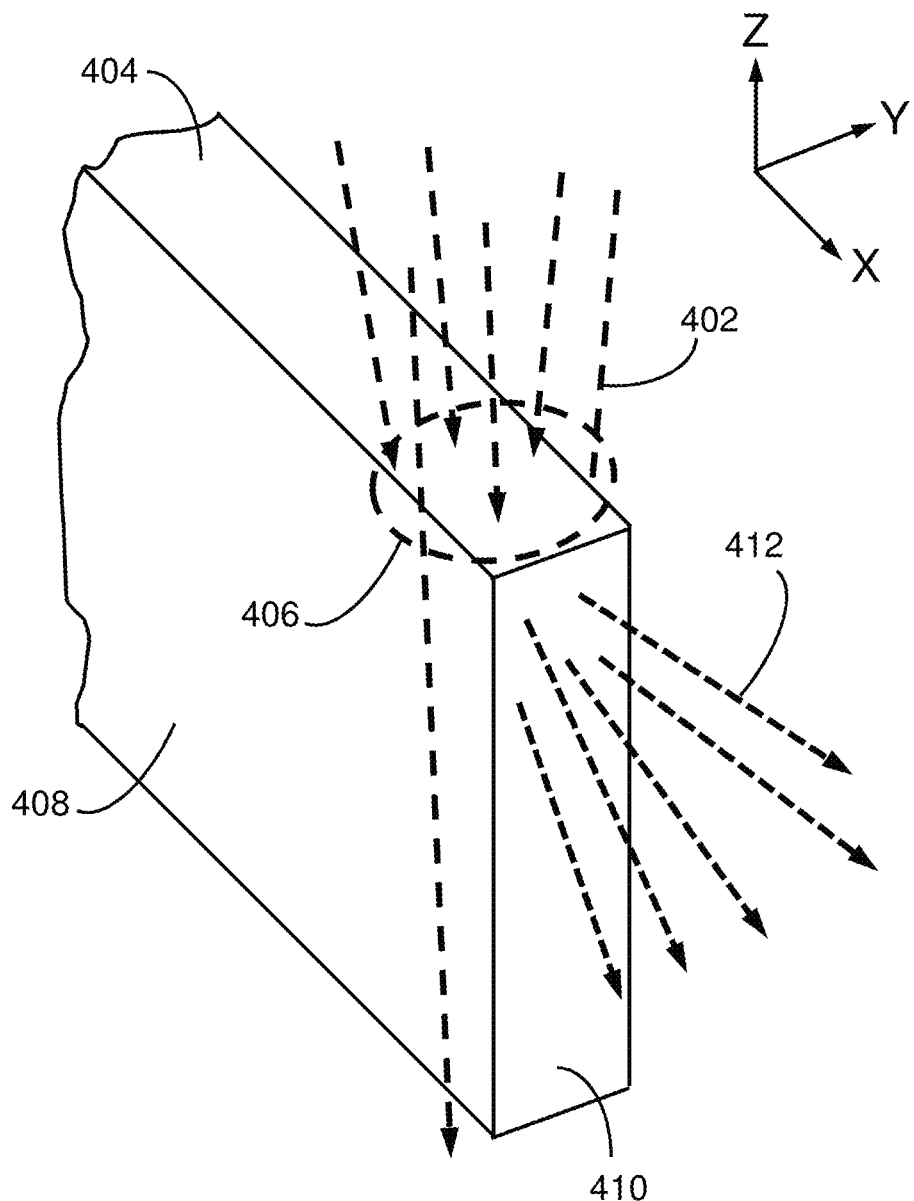
FIGS. 4A-4D show views of an x-ray source employing a lamella-shaped target with a round electron beam.

FIG. 4A is an isometric view of a lamella-shaped target 408 with an upper surface 404 being bombarded by electrons 402 in an electron beam which has been focused into a round electron beam 406 by an electron column such as would be found in a scanning electron microscope (SEM), transmission electron microscope (TEM), scanning transmission electron microscope (STEM), or any electron beam system capable of focusing a high current density electron beam onto a target. The landing energy of electrons 402 will vary with the desired energy of the x-ray photons generated by the beam. For example, to generate x-rays between about 280 and about 530 eV, the electron landing energy may be less than 2500 eV and may be in a range between 1500 eV and 2000 eV. The transverse dimension in the Y direction (referred to as the "width" of the lamella-shaped target) may be smaller than the diameter of the electron beam, so that the size of the virtual x-ray source in the Y direction is determined by the Y dimension of the target and not by the diameter of the electron beam.

Lamella-shaped target 408 is supported on a support structure (not shown) which would be at the upper left of FIG. 4A. In some embodiments, lamella-shaped target 408 may be partly embedded in the support structure. To avoid x-ray generation from the support structure due to impact by the electron beam 406, the same at least two approaches (which may be combined in some embodiments) are possible as were described above for the post target 308 in FIGS. 3A-3D. In some embodiments, lamella-shaped target 408 are cantilevered out from the support structure a distance far enough from the edge of the support structure to reduce or eliminate the amount of electron beam current which strikes the support, instead of striking the lamella-shaped target. This will reduce or eliminate the amount of Bremsstrahlung radiation generated from the support—this radiation tends to reduce the resolution and contrast in the image.

Figure 2:
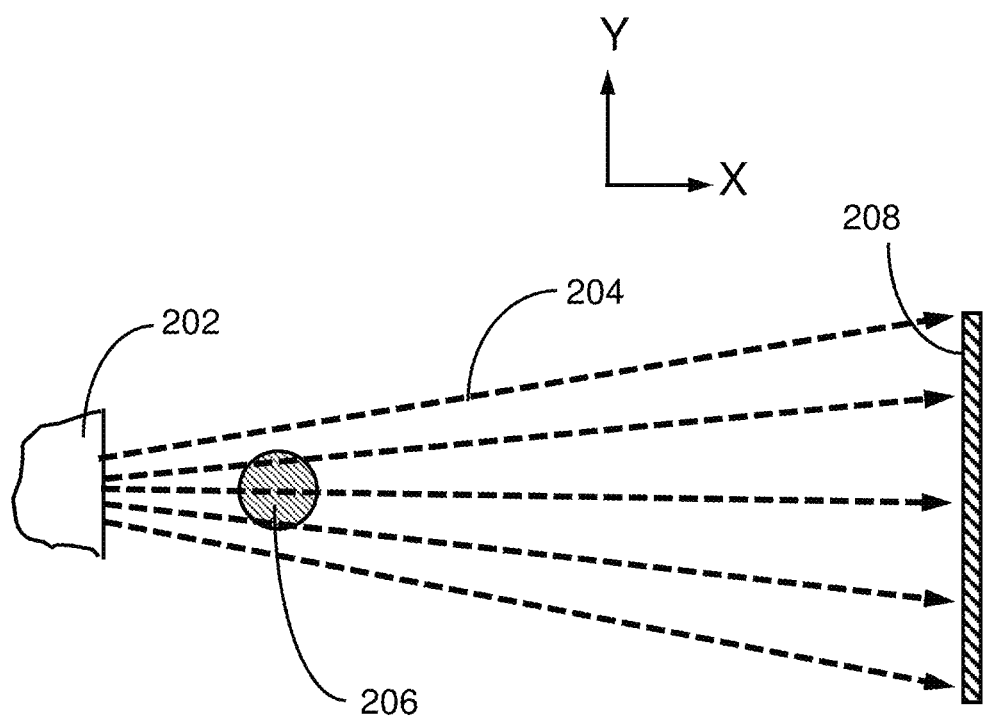
FIG. 2 shows a projection x-ray imaging configuration.

As was the case for electron beam 306 in FIGS. 3A-3D, portions of electron beam 406 may miss the narrow lamella-shaped target 408, travelling past target 408 on either side and thus not producing x-rays. The dimension along the Z-axis (referred to as the "height" of the lamella-shaped target) may be larger than the penetration depth, the portion of electron beam 406 which does not miss target 408 completely will subsequently be absorbed by target 408 and will not pass out the bottom as for the post target. Because some electrons 402 may not impact the post target 408, x-ray generation by lamella-shaped targets may be less efficient than for a bulk target (where all electrons strike the target), but more efficient than for a post target (since no electrons pass out the bottom). As was the case for the bulk target 108 in FIGS. 1A-1D, the impact of electrons 402 with lamella-shaped target 408 generates x-rays which propagate out in all directions (into a 4π steradians solid angle). X-ray flux 412 represents the very small fraction of the total x-ray flux which is emitted through the front surface 410 of target 408 in a direction towards an x-ray detector (not shown—see FIG. 2).

Figure 4B:
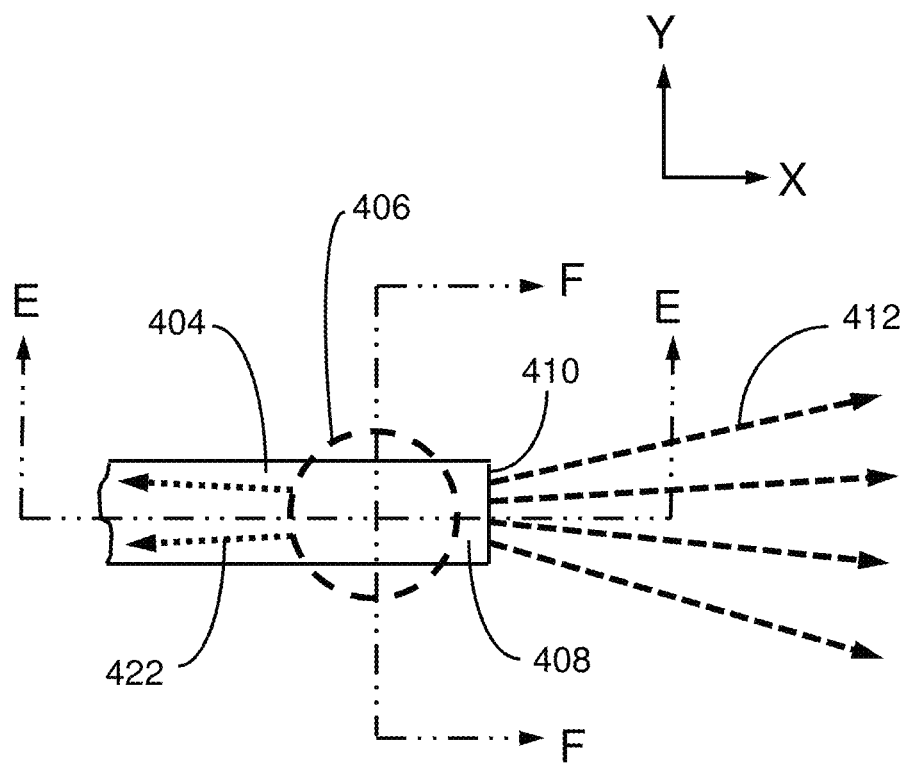
Figure 4C:
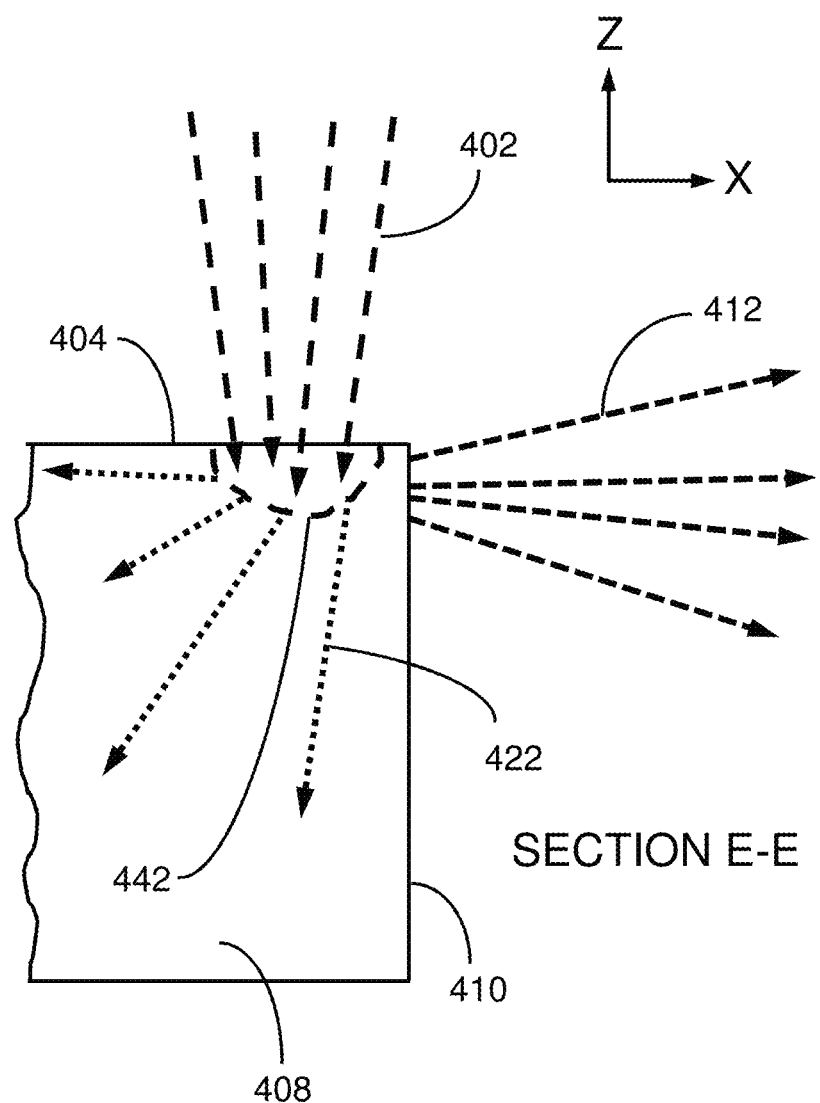
Figure 4D:
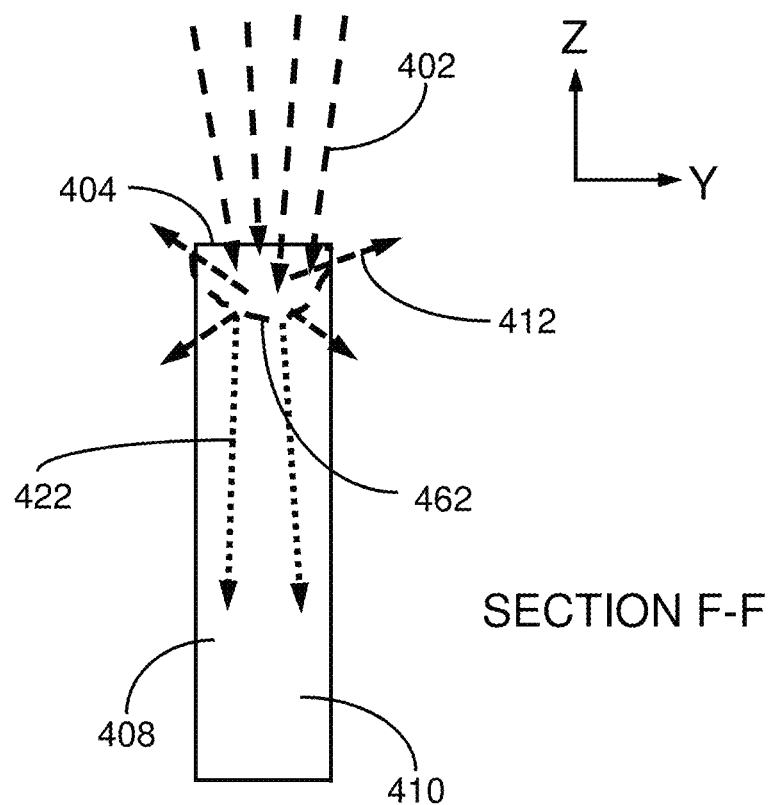

FIG. 4B is a top view (in the X-Y plane) of the x-ray source from FIG. 4A, illustrating two cross-sections E-E and F-F, which are presented in FIGS. 4C and 4D, respectively. Also illustrated is the dissipation of heat 422 generated in target 408 by absorption of kinetic energy from electrons 402 along the X-direction in the X-Y plane. The dimension in the X-direction is referred to as the "length" of the lamella-shaped target. The length has little effect on the virtual source size and so is typically several times as large as the width to aid in the dissipation of heat generated by the electron beam.

FIG. 4C is a side view cross-section E-E (in the X-Z plane) of the lamella-shaped target x-ray source from FIGS. 4A-4B. Since the Z-axis dimension of the post target 408 is larger than the electron dispersion distance, electrons 402 will stop within the lamella-shaped target. For high energy (>5 keV) electrons 402, the stopping distance may be relatively large (>1 µm), resulting a in large Z-dimension for the virtual source size. For lower energy electron beams (e.g., 1.5 keV), where the penetration depth may be only ~50 nm, the electron beam may stop within a lamella-shaped target 408. A fraction of the x-rays generated within target 408 may be reabsorbed within target 408 before reaching exit surface 410. Heat dissipation 422 may propagate out in the Z- and X-directions from the electron penetration volume 442, similarly to the situation in FIG. 1C for the bulk target.

Figure 3A:
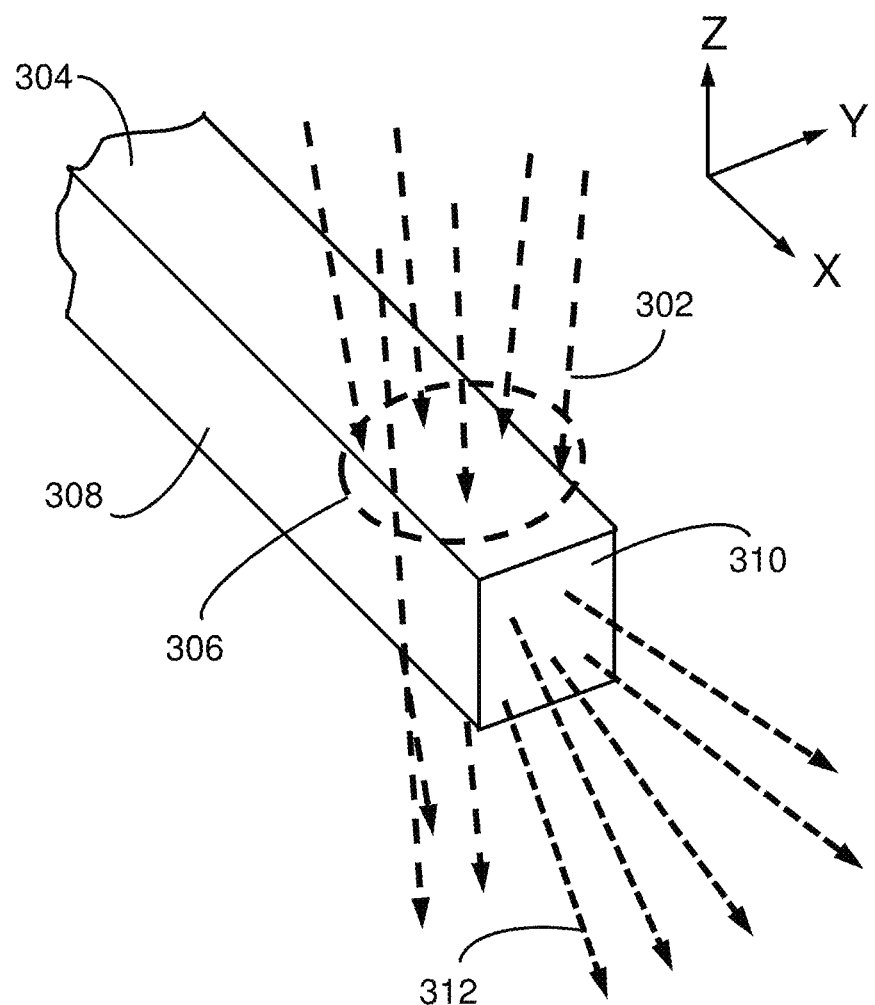
FIGS. 3A-3D show views of an x-ray source employing a post target.
Figure 3B:
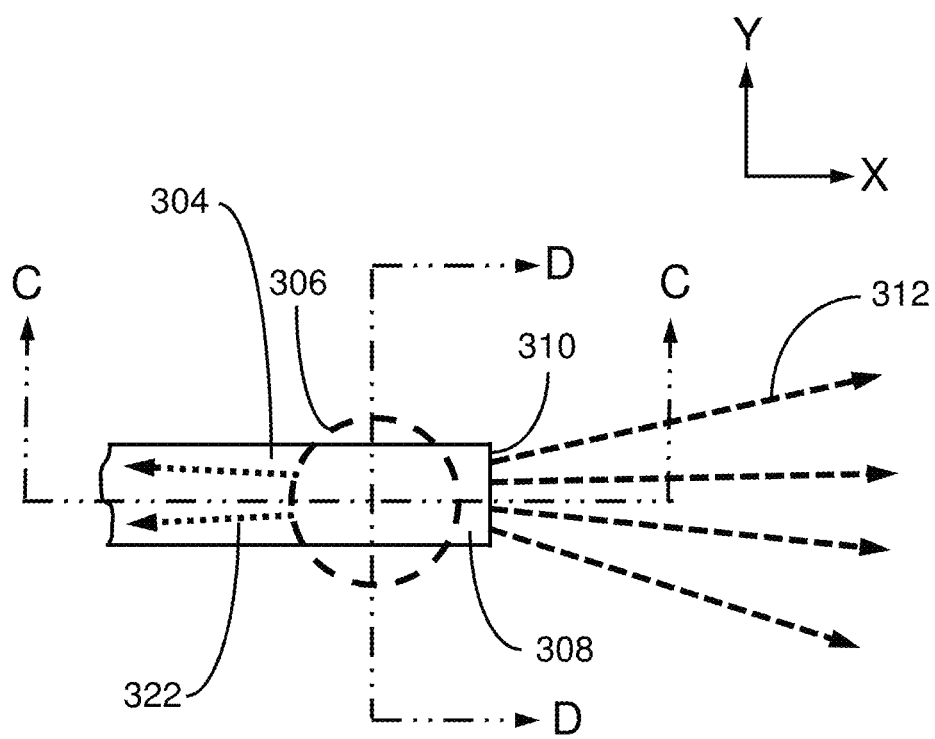
Figure 3C:
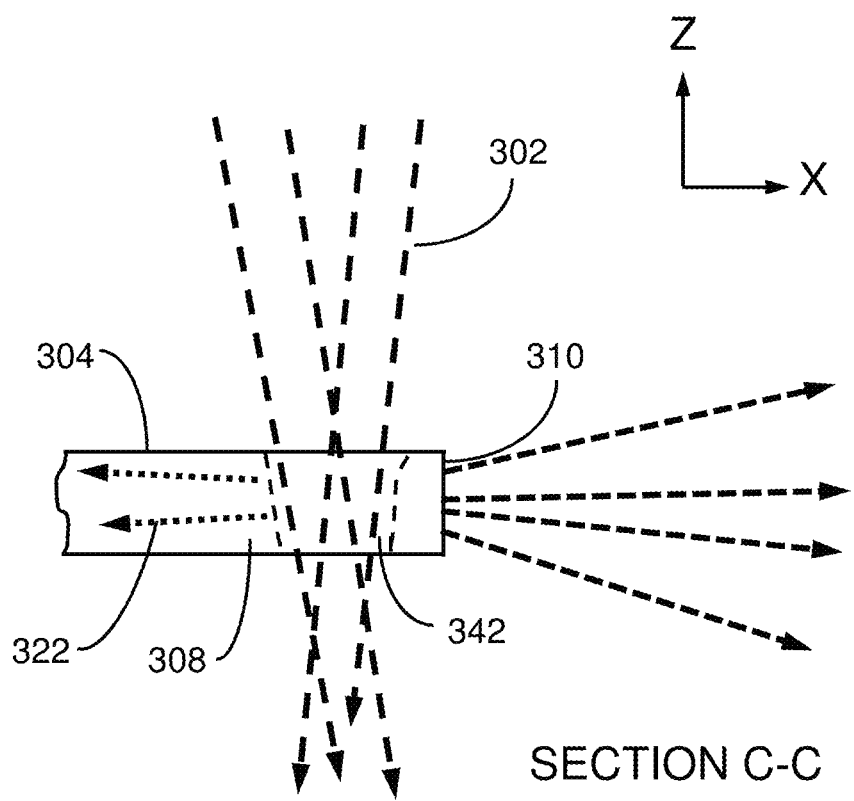
Figure 3D:
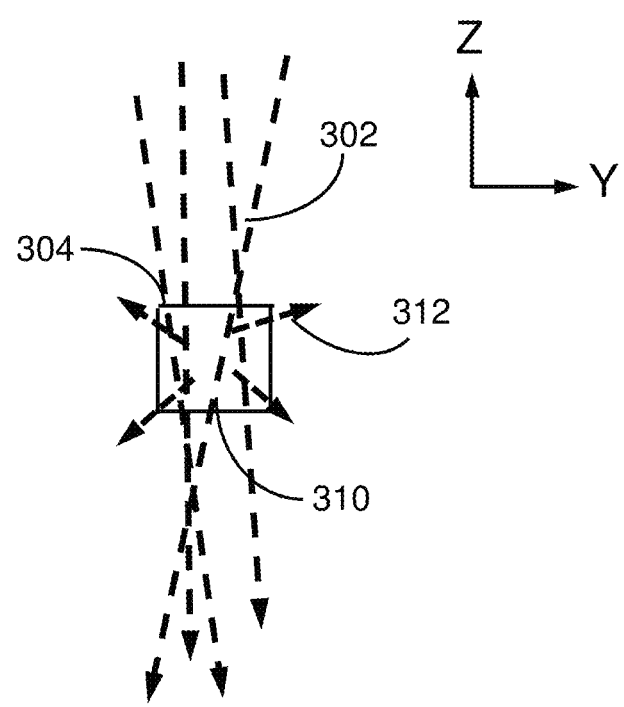

FIG. 4D is a front view cross-section F-F (in the Y-Z plane) of the lamella-shaped target x-ray source from FIGS. 3A-3C. The virtual source region will essentially comprise the upper region of surface 410, arising from electron penetration volume 462. Heat dissipation 422 may flow in the negative Z-direction from electron penetration volume 462.

Figure 8:
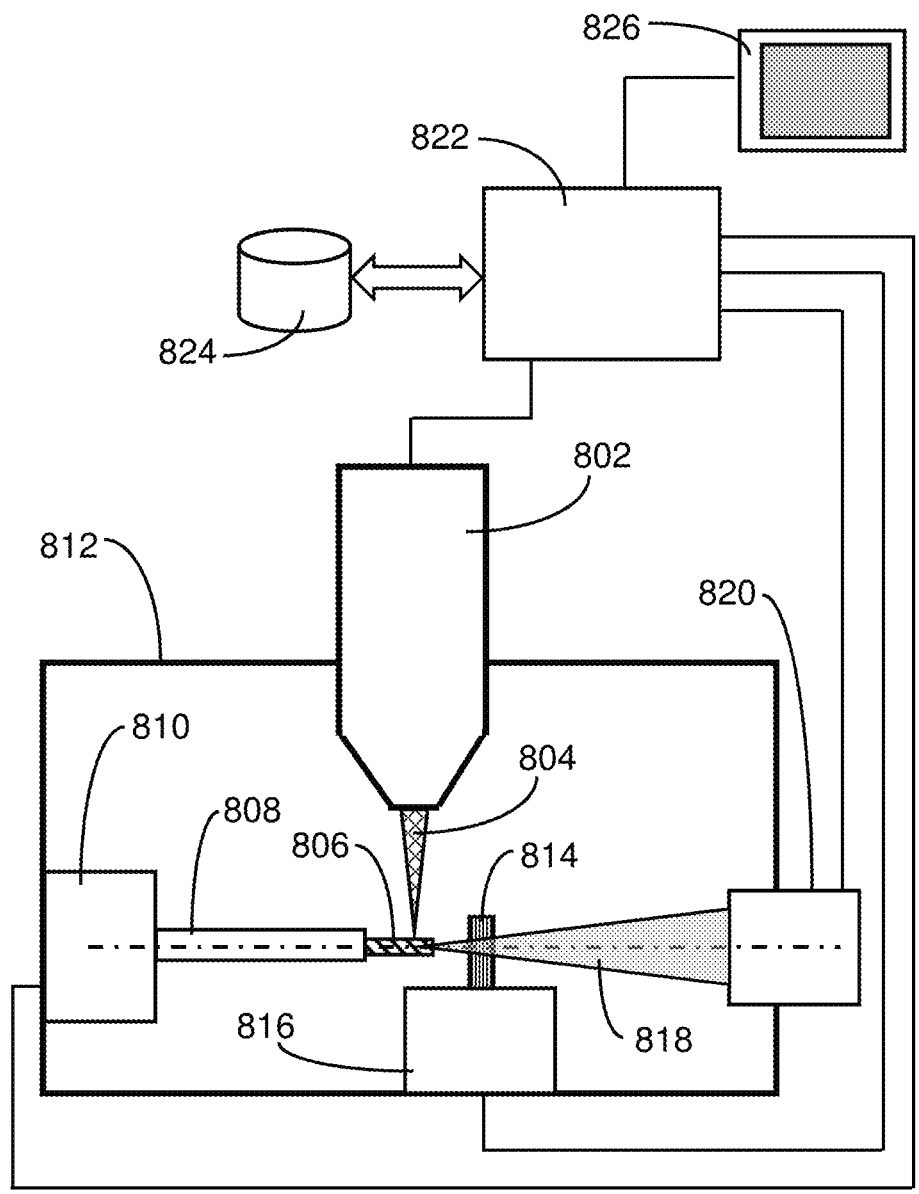
FIG. 8 is a schematic diagram of a SEM-based nanotomography system.

The angular ranges of heat dissipation 422 illustrated in FIGS. 4C-4D show that heat dissipation within a lamella-shaped target may be intermediate between the high conduction of the bulk target 108 and the low conduction of the post target 308—this is summarized in Table 900 in FIG. 9. An additional advantage of a lamella-shaped target in comparison with a post target, may be increased mechanical strength, possibly enabling longer target lifetimes and increased reliability. Typically, the lamella-shaped target may be attached to a support structure, which, in turn, may be affixed to a support arm, as illustrated in FIG. 8.

The X-Y-Z dimensions of lamella-shaped target 408 may be determined by the following criteria:

X-dimension (length perpendicular to the electron beam)—preferably large enough to prevent the electron beam from impacting the support structure, but also preferably not so long as to make thermal conduction poor from the end (where the electron beam 406 impacts). The X-dimension may be at least 500 nm, at least 1 µm, or at least 2 µm.

Y-dimension (width perpendicular to the electron beam)—comparable to the desired Y-axis resolution in the x-ray image. The Y-dimension may be less than 500 nm, less than 250 nm, or less than 100 nm.

Z-dimension (depth parallel to the electron beam)—for low energy x-ray imaging, the Z-dimension is preferably larger than the electron penetration depth in the target material. The Z-dimension may be at least 200 nm, at least 500 nm, or at least 1 µm. For a low energy electron beam, that is, less than 2 kV, the electron penetration depth is relatively small, and so the additional depth of the lamella-shaped target does not increase the z dimension of the virtual source size. The lamella-shaped target therefore reduces heating of the target because it provides additional heat-conductive material to conduct the heat away from the beam impact area and greater surface area to pass the heat into surrounding material or to radiate the heat away.

The X-Y-Z dimensions in embodiments may also be characterized by dimensional ratios:

Ratio of Z-dimension to Y-dimension—at least 2:1, at least 5:1, or at least 10:1.

Ratio of X-dimension to Y-dimension—at least 5:1, at least 7:1, or at least 10:1.

In some embodiments, the Z dimension and the X dimension are both more than twice the Y dimension.

Figure 5A:
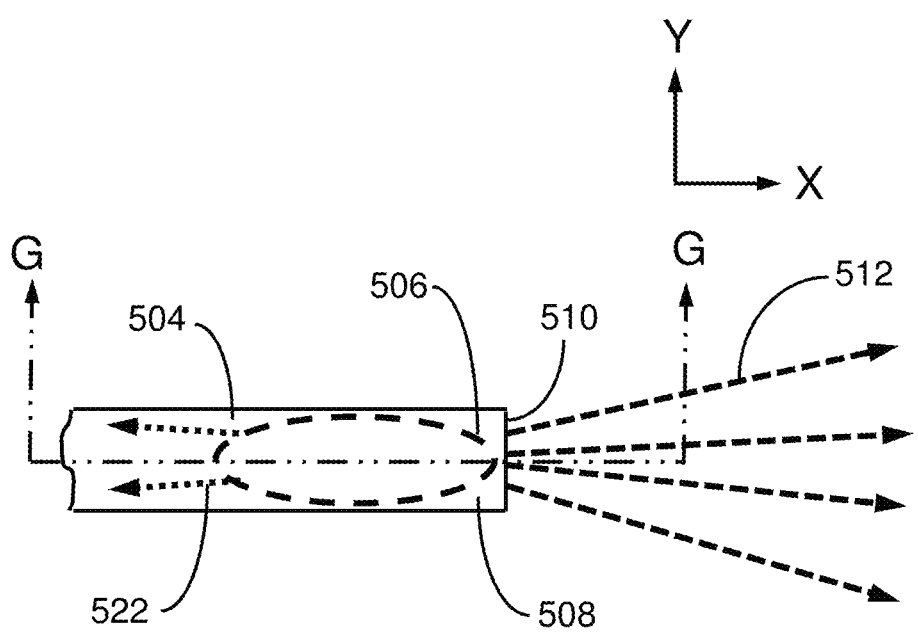
FIGS. 5A-5B show views of an x-ray source employing a lamella-shaped target with an astigmatic electron beam.
Figure 5B:
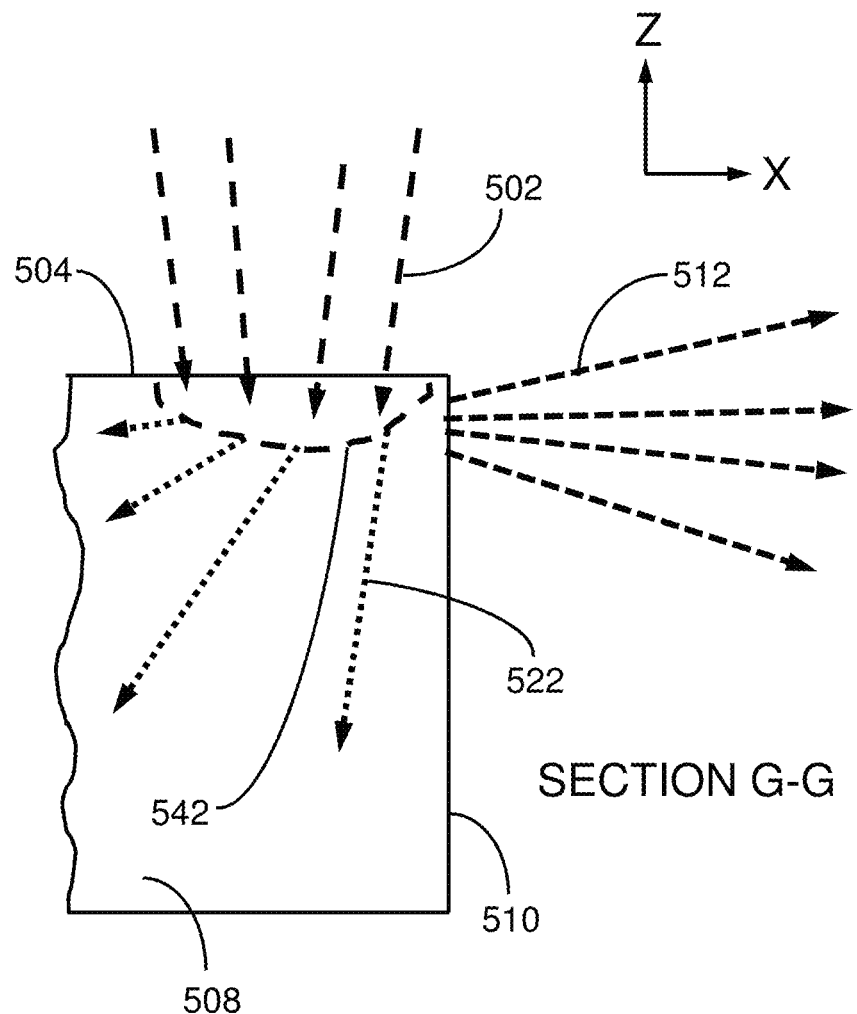

FIGS. 5A-5B show views of an x-ray source employing a lamella-shaped target with an astigmatic electron beam.

FIG. 5A is a top view (in the X-Y plane) of a lamella-shaped target 508 (which in some embodiments may be the same as lamella-shaped target 408) with an upper surface 504 being bombarded by electrons 502 in an electron beam which has been focused into an elliptical shape (i.e., astigmatic) 506 by an electron column such as would be found in a scanning electron microscope (SEM), transmission electron microscope (TEM), scanning transmission electron microscope (STEM), or any electron beam system capable of focusing a high current density electron beam onto a target. Cross-section G-G is presented in FIG. 5B. Unlike the case for electron beam 406 in FIGS. 4A-4D, electron beam 506 has been deformed (astigmated) into an elliptical shape 506 so that it entirely falls onto surface 504, thereby increasing the x-ray flux 512 compared flux 412 in FIGS. 4A-4D (since no electrons 502 miss target 508). Other aspects of this embodiment may be similar to those for the embodiment in FIGS. 4A-4D. Table 900 in FIG. 9 characterizes these aspects further.

FIG. 5B is a side cross-sectional view G-G (in the X-Z plane) of the x-ray source from FIG. 5A. The dissipation of heat 522 generated in target 508 by absorption of kinetic energy from electrons 502 is illustrated, going out from electron dissipation volume 542 in the X- and Z-directions, similarly to the situation in FIG. 4C. Note that although the electron dissipation volume 542 is now elongated in the X-direction, this may have minimal effect on the virtual source size as seen from the perspective of the sample and detector along the X-axis.

Table 900 in FIG. 9 summarizes the various aspects of x-ray source operation and performance for bulk targets (FIGS. 1A-1D), post targets (FIGS. 3A-3D), and lamella-shaped targets used with both round beams (FIGS. 4A-4D) and astigmatic (elliptical) electron beams (FIGS. 5A-5B). Both high energy (>5 keV) electron beams and low energy (<2 keV) electron beams are considered. Advantages of some embodiments may be most apparent for the low energy beams (lower half of table 900), where the lamella-shaped targets will produce virtual source sizes similar to those of post targets, while enabling generation of higher x-ray fluxes closer to those attainable with bulk targets because of the improved heat dissipation. For higher electron beam energies, the lamella-shaped targets may still demonstrate some advantages over both bulk and post target x-ray sources in circumstances where an elongated virtual source shape (larger in the Z-direction, smaller in the Y-direction) is acceptable.

Figure 6:
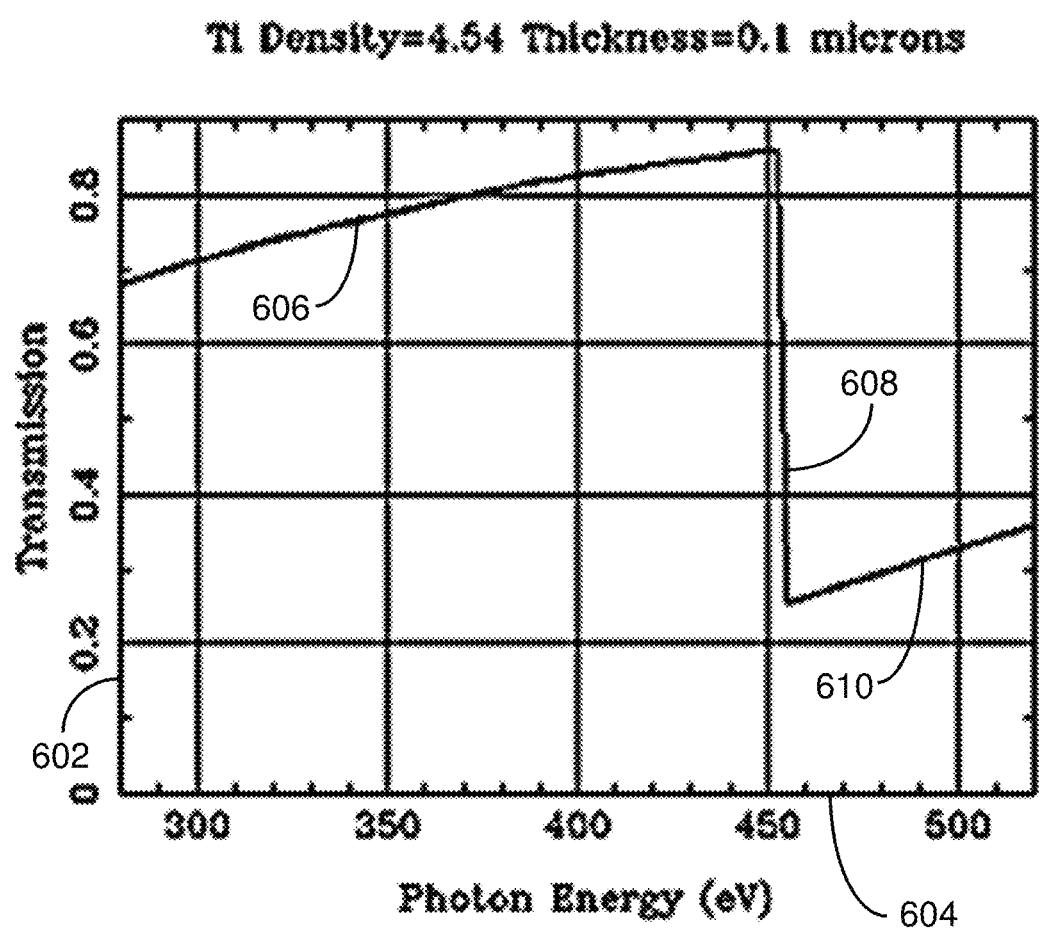
FIG. 6 is a graph of x-ray transmission as a function of x-ray energy over a wide x-ray energy range.

FIG. 6 is a graph of x-ray transmission 602 through 100 nm of titanium as a function of the x-ray energy 604 over a broad photon energy range from 280 eV to 520 eV. Below the absorption line 608 near 454 eV the transmission in region 606 ranges up to about 0.86, suddenly dropping to below 0.3 just above the absorption line 608 and then slowly increasing in region 610. Considering that the most efficient generation of x-rays by an electron beam produces largely x-rays below about ⅓ of the electron beam energy, if an electron beam with around 1.5 keV is employed, the x-rays produced will mostly have energies below the absorption peak and this will be efficiently emitted from the target—this consideration applies to any of the bulk, post, or lamella-shaped targets discussed above, assuming that the target material is titanium. Similar curves (with differing energies for the absorption line) will apply for other source materials.

Figure 7:
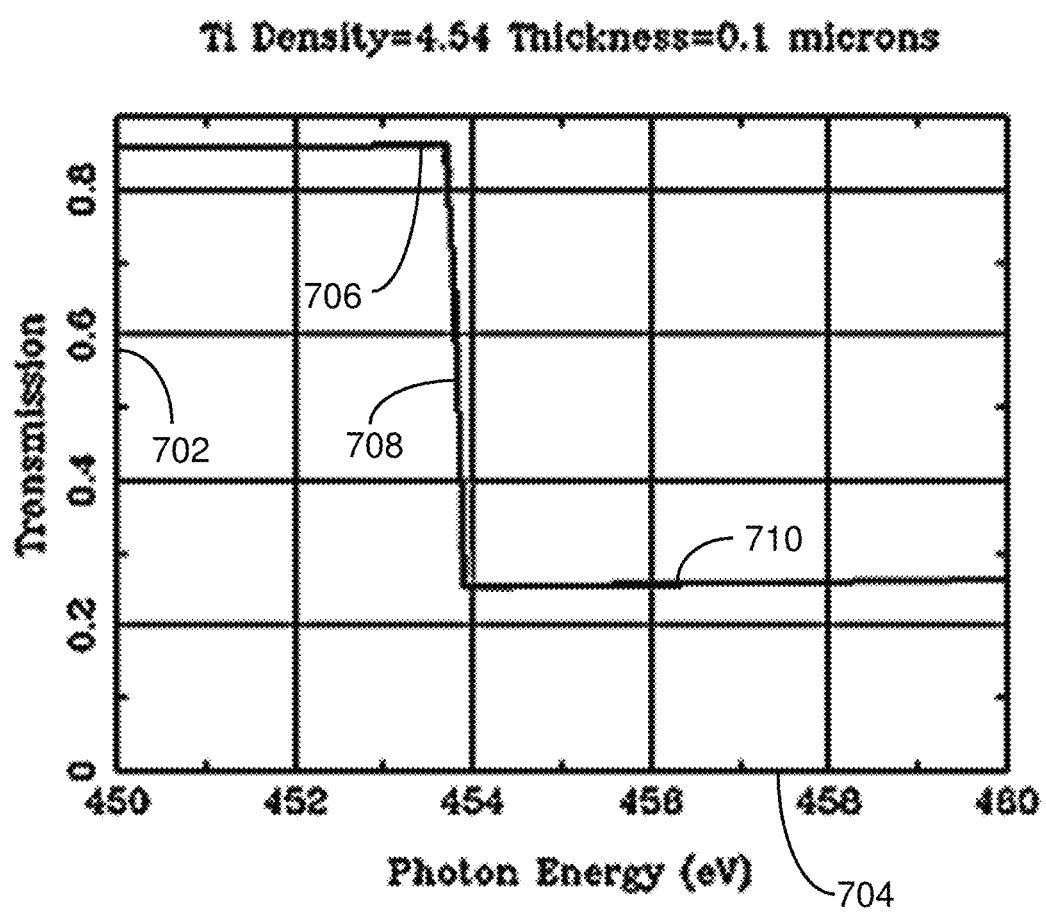
FIG. 7 is a graph of x-ray transmission as a function of x-ray energy over a narrow x-ray energy range centered on an absorption line.

FIG. 7 is a graph of x-ray transmission 702 through 100 nm of titanium as a function of the x-ray energy 704 over a narrow photon energy range from 450 eV to 460 eV. The absorption line 708 at approximately 454 eV, sharply separates the region 706 with transmission above 0.8 from the region 710 with transmission below 0.3. Titanium emits x-rays at about 452 eV, which x-rays fall in the low absorption region 706 and so those x-rays are substantially transmitted through the target and onto the target. The "water window," where natural contrast occurs between water and biological materials, corresponds to x-rays in an energy range approximately 280 to 530 eV and so embodiments of the invention are particularly advantageous in imaging biological samples.

FIG. 8 is a schematic diagram of a SEM-based nano-tomography system 800. An electron beam column 802, such as a SEM, TEM, or STEM column in an electron microscope, produces a focused electron beam 804 which may be directed onto an x-ray target 806, which is supported by mounting arm 808 which, in turn, is supported and moved along various axes by target stage 810. Target 806 may be a bulk or post target, or may be a lamella-shaped target. X-rays 818 are emitted from target 806 towards x-ray detector 820—a fraction of x-rays 818 may pass through sample (specimen) 814 before reaching detector 820. Some x-rays entering sample 814 may be absorbed by materials within sample 814, resulting in an absorption-contrast image being collected by detector 820. Sample 814 is supported, rotated, and positioned by stage 816. A vacuum enclosure 812, typically pumped to high vacuum levels, encloses a portion of column 802, target 806, sample 814 and a portion of detector 820. Although x-rays may pass freely through air, electron beam 804 requires a vacuum due to the very small mean free path of electrons in air at atmospheric pressure. Often a standard SEM may be employed, with the addition of the target stage, support arm, x-ray target, and x-ray detector, as well as possibly a modified sample stage—thereby configuring a "SEM-based Nano-CT (computed tomography) system". Typically, a system controller 822 is configured to regulate the operation of column 802, target stage 810, sample stage 816, and x-ray detector 820. A non-transitory computer-readable storage medium 824 may store computer instructions to system controller 822 to carry out the methods described herein, and may store x-ray image data acquired by detector 820. For example, system controller 822 can cause system 800 to acquire multiple x-ray images at different angles through the sample. System controller 822 can cause system 800 to form an x-ray image of the sample 814, rotate the sample, form another x-ray image, and repeat this sequence of imaging and rotating multiple times. System controller 822 may then execute a program to reconstruct a three-dimensional representation of the sample from the multiple x-ray images to produce tomographic images. A display device 826 may display system control information as well as 2D x-ray images and 3D x-ray tomography results.

Figure 10:
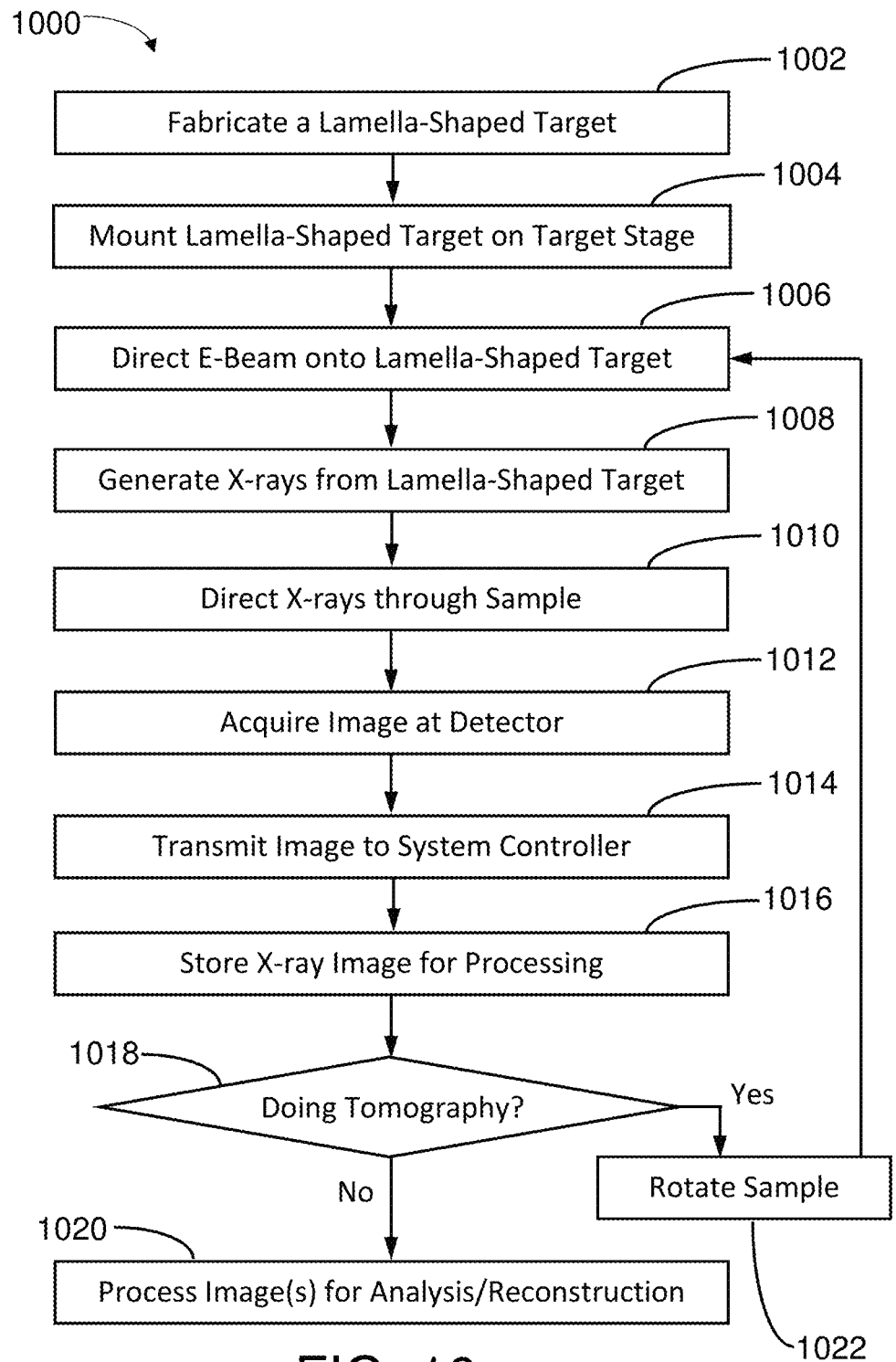
FIG. 10 is a flow chart of a method for collecting x-ray imaging and tomography data for a sample.

FIG. 10 is a flow chart 1000 depicting a method for collecting x-ray imaging and tomography data from a sample. A lamella-shaped target is fabricated in block 1002. In some embodiments, target fabrication may be performed using a focused ion beam in a stand-alone microfabrication system such as a dual-beam FIB-SEM produced by Thermo-Fisher Scientific, Corp. In other embodiments, target fabrication may be performed in a similar system to that shown in FIG. 8, where an additional focused ion beam column has been added, enabling both FIB-milling of the lamella material as well as SEM imaging for process monitoring and endpoint control. If the lamella is fabricated within the same system as that used for x-ray imaging, then block 1004 may be skipped over (since the lamella-shaped target may already be on the target stage during fabrication).

After fabrication of the lamella-shaped target, in block 1004 the target is mounted on a target stage, as illustrated in the embodiment of FIG. 8. In block 1006, the electron beam column may then be adjusted to focus an electron beam onto the target, typically towards the end of the target nearest the sample and x-ray detector—the beam may be either round (as in FIGS. 4A-4D) or elliptical (as in FIGS. 5A-5B). Once the electron beam has been focused onto the target, x-rays are generated in block 1008 by interactions between the incoming electrons in the beam and inner-shell electrons of the target material in a well-known process. As illustrated in both FIGS. 2 and 8, a small portion of the total x-ray flux (which is emitted into a $4\pi$ steradians solid angle) will be emitted into the solid angle subtended by the x-ray detector at the target in block 1010. For proper x-ray imaging, it may be necessary to use stage 816 to position sample 814 within the cone 818 of x-ray flux. In block 1012, those x-rays initially emitted from the target 806 towards x-ray detector 820, and not subsequently absorbed within sample 814, will be collected by detector 820 to acquire an x-ray shadow (i.e., absorption) image which is conveyed to system controller 822 in block 1014 and then stored in non-transitory computer-readable storage medium 824 in block 1016.

In block 1018, if the user is doing 2D x-ray imaging (i.e., not tomography), then block 1020 is entered where the system controller, or another (off-line) processing system, may be employed for image analysis, processing and display. If the user is doing 3D tomography, then a series of images at various rotation angles of sample 814 will typically be required, and block 1022 is entered, wherein the sample is rotated, typically by an angular increment between 0.5° and 2.0°, after which block 1006 is entered and the image acquisition loop comprising blocks 1006-1016 is executed again. This repetition may typically require between 90 and 360 images, after which block 1020 is entered to perform a 3D tomographic reconstruction.

The following are additional enumerated embodiments according to the present disclosure:

A first embodiment, which is a method for producing an x-ray image of a sample, the method comprising directing a beam of electrons having landing energies of less than 2,000 eV along a first axis onto a first surface of a lamella-shaped target, the impact of the electrons in the beam onto the lamella-shaped target generating x-rays from within an interaction volume within the lamella-shaped target, wherein a portion of the x-rays are emitted towards an x-ray detector; positioning a sample along a second axis between the lamella-shaped target and the x-ray detector; and acquiring an x-ray image by collecting the x-rays which are not absorbed by the sample using the x-ray detector, wherein the lamella-shaped target has a height in a direction along the first axis, a length in a direction along the second axis, and a width along a third axis that is different from the first and second axes; the height and the length are at least twice the width; and the electron beam interaction volume extends along the first axis from the first surface a distance of less than the height of the lamella-shaped target, thereby providing a virtual x-ray source in which the virtual source size along the first axis is determined not by the height of the lamella-shaped target but by the extent of the interaction volume along the first axis.

A second embodiment, which is the method of the first embodiment, in which directing a beam of electrons comprises directing a beam of electrons having at the target surface a diameter greater than the width of the lamella-shaped target.

A third embodiment, which is the method of the first embodiment, in which the interaction volume extends from the first surface to a distance of less than one half the height of the lamella-shaped target.

A fourth embodiment, which is the method of the first embodiment, in which the interaction volume extends from the first surface to a distance of less than one quarter the height of the lamella-shaped target.

A fifth embodiment, which is the method of first embodiment, in which the height and the length are both at least twice the width.

A sixth embodiment, which is the method of the first embodiment, in which the height and the length are both greater than 500 nm and the width is less than 200 nm.

A seventh embodiment, which is the method of the first embodiment, further comprising a) rotating the sample; b) directing the electron beam onto a first surface of a lamella-shaped target; c) acquiring a subsequent x-ray image; then repeating steps a) b) and c) to acquire a multiplicity of x-ray images; and processing the multiplicity of x-ray images to form a 3D tomographic reconstruction of the sample.

An eighth embodiment, which is the method of the first embodiment, wherein directing a beam of electrons having landing energies of less than 2000 eV along a first axis onto a first surface of a lamella-shaped target comprises directing an electron beam in which the electrons have landing energies in the range of 1500 to 2000 eV.

A ninth embodiment, which is a method for producing an x-ray image of a sample, the method comprising directing an electron beam along a first axis onto a first surface of a lamella-shaped target, the impact of the electrons in the beam onto the lamella-shaped target generating x-rays, wherein a portion of the x-rays are emitted towards an x-ray detector; positioning a sample along a second axis between the lamella-shaped target and the x-ray detector; and acquiring an x-ray image by collecting the x-rays which are not absorbed by the sample using the x-ray detector, in which the lamella-shaped target has a height in a direction along the first axis, a length in a direction along the second axis, and a width along a third axis that is different from the first and second axes, the height and the length being at least twice the width.

A tenth embodiment, which is the method of the eighth embodiment, in which the height and the length are at least three times the width.

An eleventh embodiment, which is the method of the eighth embodiment, further comprising a) rotating the sample; b) directing the electron beam onto a first surface of a lamella-shaped target; c) acquiring a subsequent x-ray image; d) repeating steps a) b) and c) to acquire a multiplicity of x-ray images; and processing the multiplicity of x-ray images to form a 3D tomographic reconstruction of the sample.

A twelfth embodiment, which is the method of the eighth embodiment, in which directing the electron beam onto a first surface of a lamella-shaped target comprises directing an electron beam in which the electrons have landing energies in the range of 1500 to 2000 eV.

A thirteenth embodiment, which is the method of the twelfth embodiment, in which directing the electron beam onto a first surface of a lamella-shaped target comprises directing an electron beam in which the electrons have a penetration depth of equal to the less than twice the width of the lamella-shaped target.

A fourteenth embodiment, which is the method of the first embodiment, in which the length and the height are equal to or greater than 200 nm and the width is equal to or less than 200 nm.

A fifteenth embodiment, which is the method of the first embodiment, in which the length and the height are equal to or greater than 1 µm and the width is equal to or less than 200 nm.

A sixteenth embodiment, which is the method of the first embodiment, in which the ratio of the depth to the width is at least 5:1.

A seventeenth embodiment, which is a system for acquiring x-ray images from a sample, comprising an electron column for producing an electron beam along a first axis; a lamella-shaped target positioned at a target position such that the lamella-shaped target will be impacted by the electron beam; a sample stage for positioning the sample at a sample position at which the sample will be impacted by x-rays emitted from the target upon impact of the electron beam onto the target; and an x-ray detector for collecting x-rays emitted from the target due to impact by the electron beam and passing through the sample, a line from the lamella-shaped target through the sample position to the x-ray detector defining a second axis; in which the lamella-shaped target has a height in a direction along the first axis, a length in a direction along the second axis, and a width in a direction normal to the first and second axes, the height and the length being at least twice the width.

An eighteenth embodiment, which is the system of the seventeenth embodiment, in which the sample stage is a rotatable sample stage.

A nineteenth embodiment, which is the system of the seventeenth embodiment, further comprising a controller for controlling the acquiring x-ray images from a sample; and a computer memory, configured to store machine readable instructions to be executed by the processing system.

A twentieth embodiment, which is the system of the nineteenth embodiment, in which the computer memory stores instructions to repeatedly acquire an x-ray image of the sample and rotate the sample; and combine the repeatedly acquired images to produce a three-dimensional representation of the sample.

A twenty-first embodiment, which is the system of the seventeenth embodiment, wherein the lamella-shaped target is fabricated from a group of x-ray producing materials consisting of: tungsten, molybdenum, titanium, scandium, vanadium, silver, or a refractory metal.

Although the present invention and its advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, composition of matter, means, methods and steps described in the specification.

For example, while the methods and apparatus disclosed herein have been described for use in an x-ray tomography system, the methods and apparatus can be generally employed in any type of x-ray projection imaging system. Moreover, in addition to obtaining x-ray absorption images, the disclosed methods and apparatus can be used to obtain other types of sample contrast images, such as phase contrast or diffraction contrast images. Phase and diffraction contrast images may be more useful when imaging samples containing small structures.

As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A method for producing an x-ray image of a sample, the method comprising:
    directing a beam of electrons having landing energies of less than 2,000 eV along a first axis onto a first surface of a lamella-shaped target, an impact of the electrons in the beam onto the lamella-shaped target generating x-rays from within an interaction volume within the lamella-shaped target, wherein a portion of the x-rays are emitted through a front surface of the lamella-shaped target towards an x-ray detector along a second axis, the front surface is different from the first surface, and the second axis is different from the first axis;
    positioning a sample along the second axis between the lamella-shaped target and the x-ray detector; and
    acquiring an x-ray image by collecting the x-rays which are not absorbed by the sample using the x-ray detector, in which:
    the lamella-shaped target has a height in a direction along the first axis, a length in a direction along the second axis, and a width along a third axis that is different from the first and second axes;
    the height and the length are at least twice the width; and
    the interaction volume extends along the first axis from the first surface a distance of less than the height of the lamella-shaped target, thereby providing a virtual x-ray source in which the virtual source size along the first axis is determined not by the height of the lamella-shaped target but by the extent of the interaction volume along the first axis.

2. The method of claim 1 in which directing a beam of electrons comprises directing a beam of electrons having at the first surface a diameter greater than the width of the lamella-shaped target.

3. The method of claim 1 in which the interaction volume extends from the first surface to a distance of less than one half the height of the lamella-shaped target.

4. The method of claim 1 in which the interaction volume extends from the first surface to a distance of less than one quarter the height of the lamella-shaped target.

5. The method of claim 1 in which the height and the length are both at least twice the width.

6. The method of claim 1 in which the height and the length are both greater than 500 nm and the width is less than 200 nm.

7. The method of claim 1 further comprising:
    a) rotating the sample;
    b) directing the electron beam onto a first surface of a lamella-shaped target;
    c) acquiring a subsequent x-ray image;
    d) repeating steps a) b) and c) to acquire a multiplicity of x-ray images; and
    e) processing the multiplicity of x-ray images to form a 3D tomographic reconstruction of the sample.

8. The method of claim 1 wherein directing a beam of electrons having landing energies of less than 2000 eV along a first axis onto a first surface of a lamella-shaped target comprises directing an electron beam in which the electrons have landing energies in the range of 1500 to 2000 eV.

9. The method of claim 1 in which the length and the height are equal to or greater than 200 nm and the width is equal to or less than 200 nm.

10. The method of claim 1 in which the length and the height are equal to or greater than 1 μm and the width is equal to or less than 200 nm.

11. The method of claim 1 in which the ratio of the depth to the width is at least 5:1.

12. The method of claim 1, wherein the beam of electrons has a landing energy of less than 1500 eV.

13. The method of claim 1, wherein the virtual x-ray source size along the third axis is determined by the width of the lamella-shaped target.

14. The method of claim 1, wherein the lamella-shaped target comprises a target material, and the diameter of the beam of electrons at the first surface is less than the length of the lamella-shaped target.

15. A method for producing an x-ray image of a sample, the method comprising:
    directing an electron beam along a first axis onto a first surface of a lamella-shaped target, an impact of the electrons in the beam onto the lamella-shaped target generating x-rays from within an interaction volume within the lamella-shaped target, wherein a portion of the x-rays are emitted through a front surface of the lamella-shaped target towards an x-ray detector, the front surface is different from the first surface;
    positioning a sample along a second axis between the lamella-shaped target and the x-ray detector, the second axis is different from the first axis; and
    acquiring an x-ray image by collecting the x-rays which are not absorbed by the sample using the x-ray detector, in which the lamella-shaped target has a height in a direction along the first axis, a length in a direction along the second axis, and a width along a third axis that is different from the first and second axes, the height and the length being at least twice the width, and the interaction volume extends along the first axis from the first surface a distance of less than the height of the lamella-shaped target.

16. The method of claim 15 in which the height and the length are at least three times the width.

17. The method of claim 15 further comprising:
    a) rotating the sample;
    b) directing the electron beam onto a first surface of a lamella-shaped target;
    c) acquiring a subsequent x-ray image;
    d) repeating steps a) b) and c) to acquire a multiplicity of x-ray images; and processing the multiplicity of x-ray images to form a 3D tomographic reconstruction of the sample.

18. The method of claim 15 in which directing the electron beam onto a first surface of a lamella-shaped target comprises directing an electron beam in which the electrons have landing energies in the range of 1500 to 2000 eV.

19. The method of claim 18 in which directing the electron beam onto a first surface of a lamella-shaped target comprises directing an electron beam in which the electrons have a penetration depth of equal to the less than twice the width of the lamella-shaped target.

20. A system for acquiring x-ray images from a sample, comprising:
   an electron column for producing an electron beam along a first axis;
   a lamella-shaped target positioned at a target position such that a first surface of the lamella-shaped target is impacted by the electron beam;
   a sample stage for positioning the sample at a sample position at which the sample will be impacted by x-rays emitted from an interaction volume within the target upon impact of the electron beam onto the target; and
   an x-ray detector for collecting x-rays emitted through a front surface of the target due to impact by the electron beam and passing through the sample, a line from the lamella-shaped target through the sample position to the x-ray detector defining a second axis, wherein the front surface is different from the first surface, and the second axis is different from the first axis;
   in which the lamella-shaped target has a height in a direction along the first axis, a length in a direction along the second axis, and a width in a direction normal to the first and second axes, the height and the length being at least twice the width, and
   the interaction volume extends along the first axis from the first surface a distance of less than the height of the lamella-shaped target.

21. The system for acquiring x-ray images from a sample of claim 20 in which the sample stage is a rotatable sample stage.

22. The system for acquiring x-ray images from a sample of claim 20, further comprising:
   a controller for controlling the acquiring x-ray images from a sample; and
   a computer memory, configured to store machine readable instructions to be executed by the controller.

23. The system for acquiring x-ray images from a sample of claim 22 in which the computer memory stores instructions to:
   repeatedly acquire an x-ray image of the sample and rotate the sample; and
   combine the repeatedly acquired images to produce a three-dimensional representation of the sample.

24. The system for acquiring x-ray images from a sample of claim 20, wherein the lamella-shaped target is fabricated from a group of x-ray producing materials consisting of: tungsten, molybdenum, titanium, scandium, vanadium, silver, or a refractory metal.

* * * * *